March 3, 1970         G. J. KILBANE         3,498,866
APPARATUS AND PROCESS FOR ADHESIVELY BONDING TUBULAR JOINTS
Original Filed July 20, 1965         4 Sheets-Sheet 1
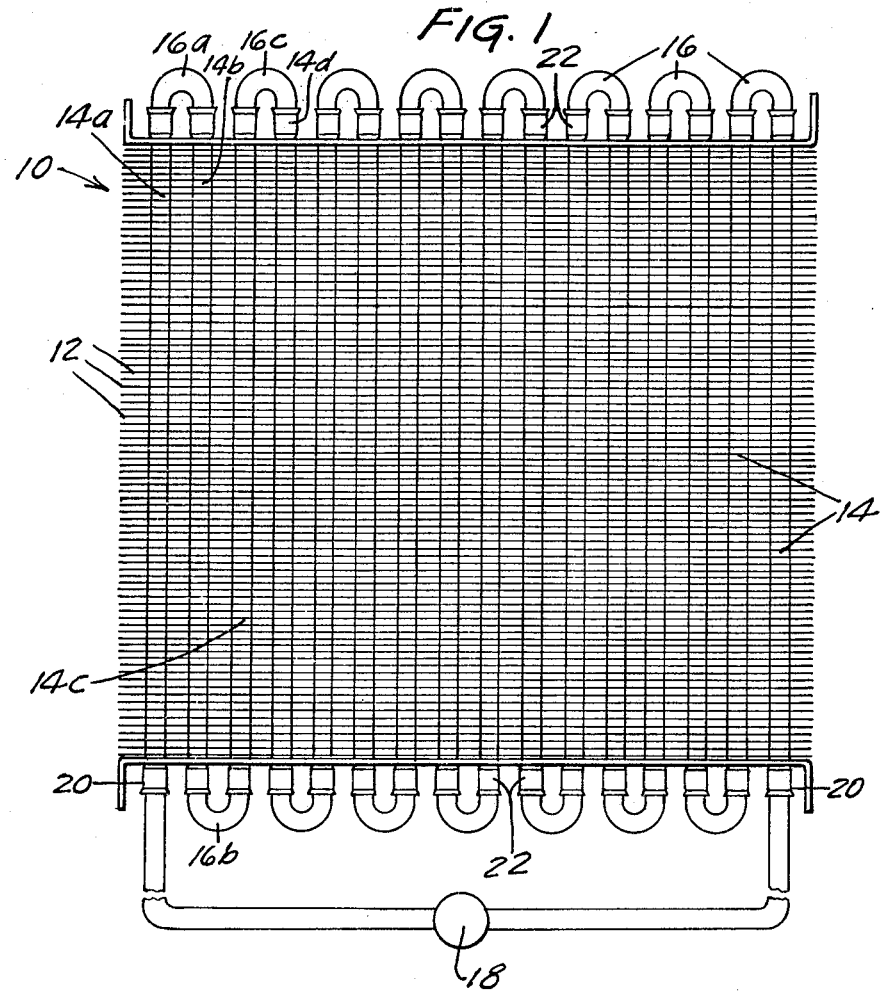
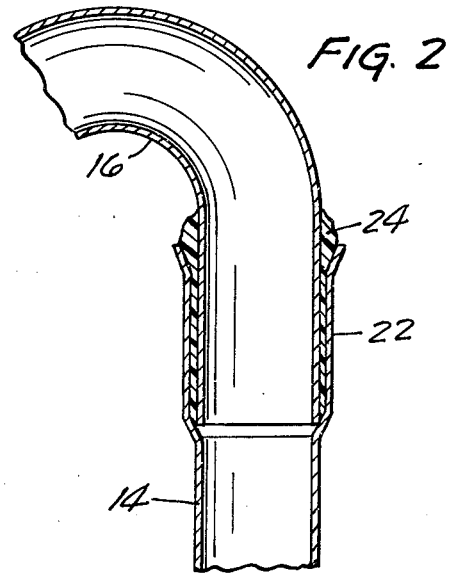
INVENTOR.
GEORGE J. KILBANE
BY
Carpenter, Kinney & Coulter
ATTORNEYS

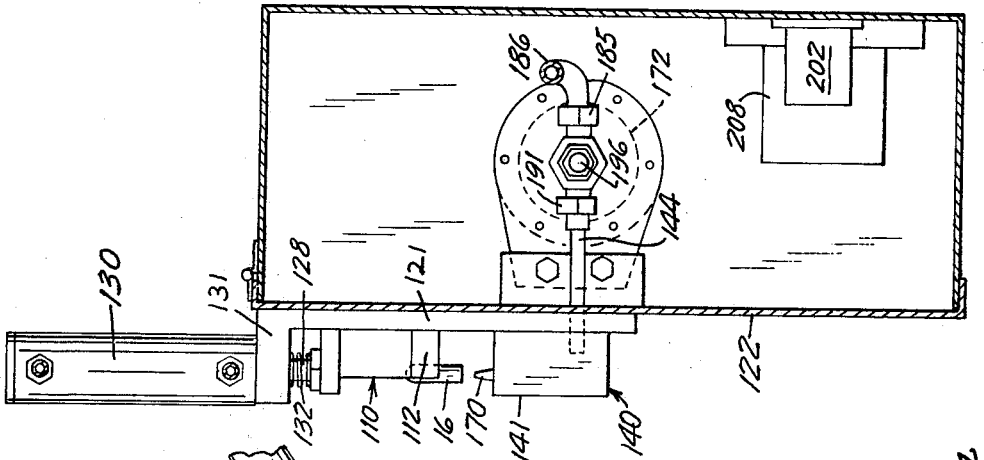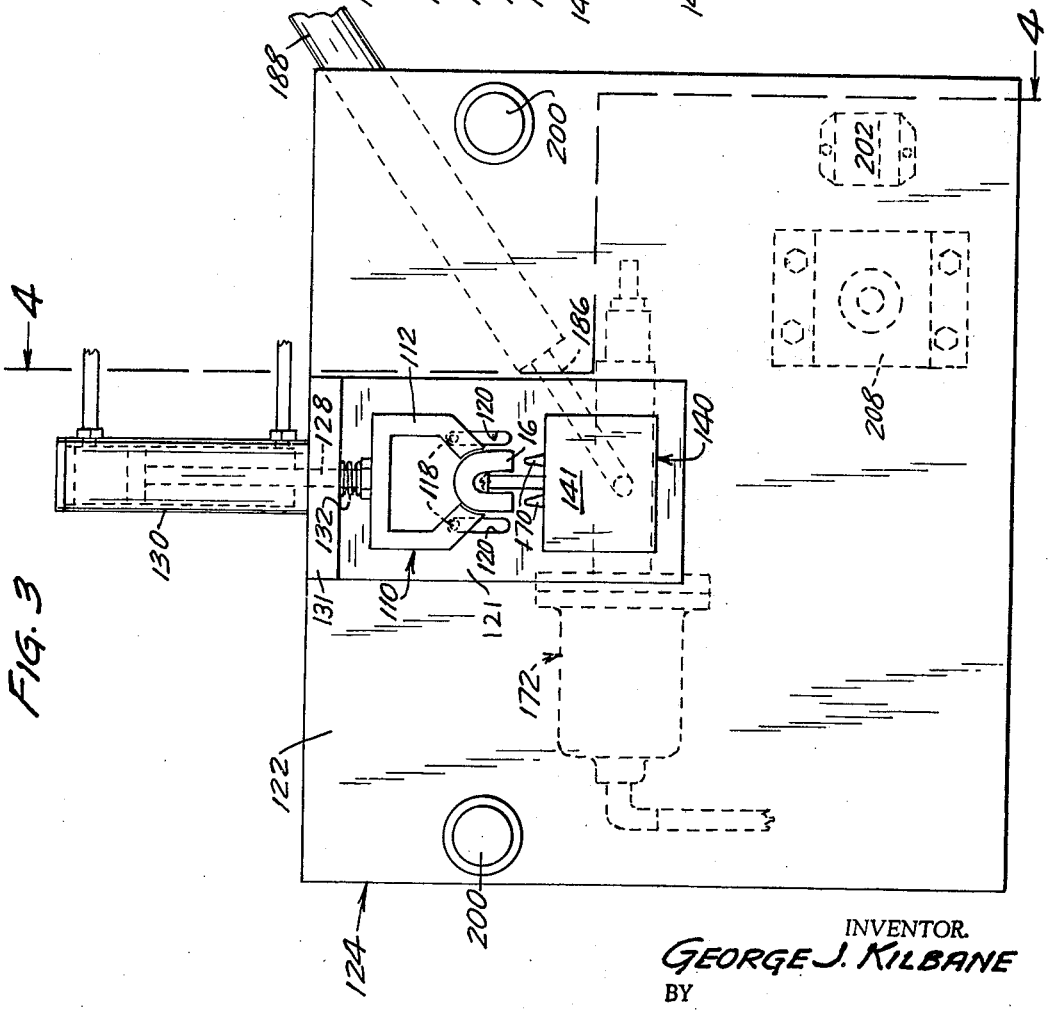

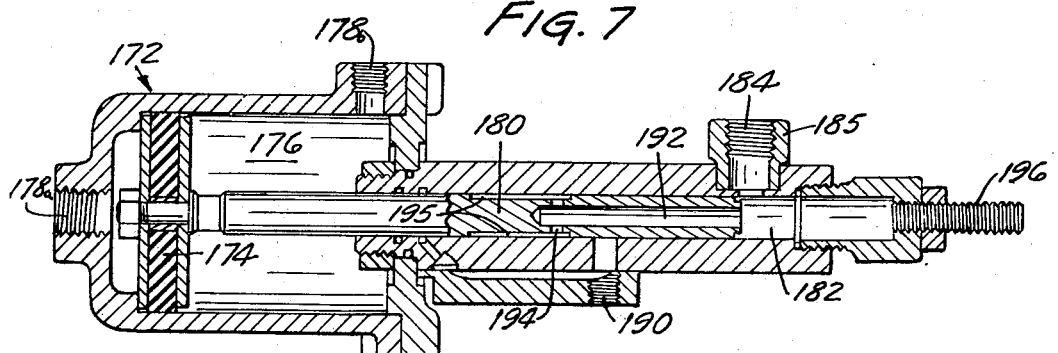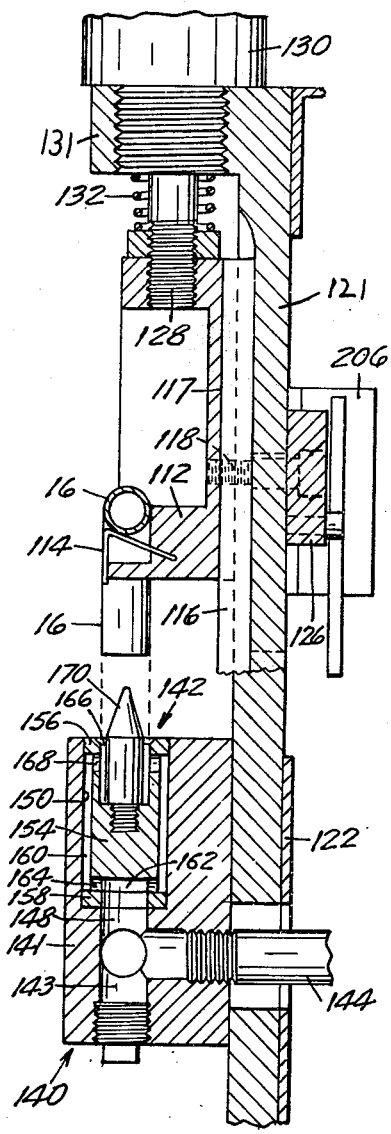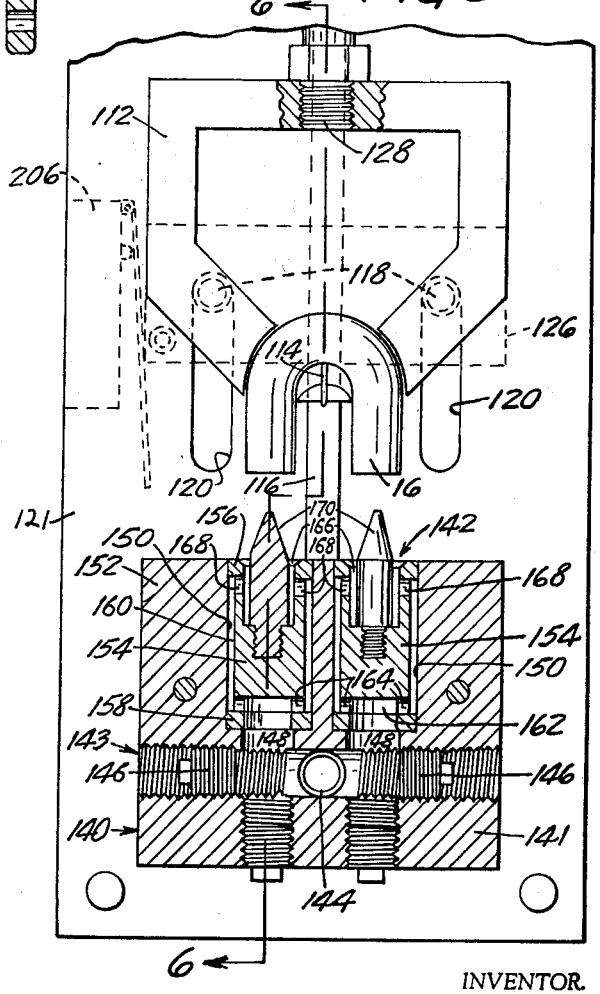

INVENTOR.
GEORGE J. KILBANE
BY
Carpenter, Kinney & Coulter
ATTORNEYS

United States Patent Office 3,498,866
Patented Mar. 3, 1970

3,498,866
APPARATUS AND PROCESS FOR ADHESIVELY BONDING TUBULAR JOINTS
George J. Kilbane, White Bear Lake, Minn., assignor to Minnesota Mining and Manufacturing Company, St. Paul, Minn., a corporation of Delaware
Original application July 20, 1965, Ser. No. 473,312. Divided and this application Apr. 7, 1967, Ser. No. 643,772
Int. Cl. B05b 13/06; B05c 5/02
U.S. Cl. 156—285                    7 Claims

ABSTRACT OF THE DISCLOSURE

Apparatus for applying a uniform and continuous collar of a heat-curable adhesive material on the end surface of a tubing piece, the adhesive being applied by means of an adhesive applicator nozzle connected to an adhesive dispensing chamber wherein the end of the tubing piece is positioned by a tube holder assembly. Also, a method of making a tubing joint comprising applying an adhesive collar onto the end surface of a tubing piece, inserting the adhesively coated tubing piece into the bell-shaped end of a second tubing piece, applying a vacuum to the connected pieces and heat-curing the adhesive.

---

This is a division of application Ser. No. 473,312, filed July 20, 1965, now abandoned.

This invention relates to adhesively bonded tubular joints, and to apparatus and method for production of the same.

A specific application of my invention concerns the field of refrigeration where metal tubing is used to conduct refrigerant gases through stages of compression and expansion to produce the cooling cycle for various refrigeration units, e.g. air conditioners, refrigerators and the like. The substantial length of tubing required to accomplish the cooling cycle is formed into a serpentine coil so as to accommodate the available spacing of the refrigeration unit. These coils are preferably made by interconnecting numerous sections of straight parallel tubing with sections of U-shaped connecting tubing. Such an assembly of parallel sections and serpentine forming U-shaped connecting sections is able to provide the required continuous tubular passageway that is sufficiently compact for the available spacing of a modern refrigeration unit. The connecting joints between the sections are required to be sufficiently secure and gas tight to withstand handling abuses (e.g. during shipping etc.) and to prevent gas leakage when subjected to the pressures encountered in the expansion stage of the cooling cycle. The industry advantageously utilizes serpentine coil constructions having upwards of fifty and more interconnections in a single coil and thus the proper formation of the interconnections is a substantially important aspect in the manufacture of such refrigeration units.

It is generally considered in the refrigeration industry that the materials which are most appropriate for providing the desired heat exchange properties in the cooling cycle are copper and aluminum. Copper tubing is far more expensive than aluminum tubing and aluminum is therefore the more desirable of the two materials. However, heretofore the only known way of producing the necessary secure and gas tight joints between the tubing pieces was by soldering. Aluminum cannot be soldered without using corrosive flux. A corrosive residue is formed by the flux which is very difficult to remove and thus the industry at present almost exclusively uses copper tubing.

Adhesives have long been known for producing strong metal-to-metal bonds, including the bonding of aluminum and copper, while avoiding the drawbacks inherent in soldering metals. Adhesive joints have thus been successfully employed in many areas as an effective and improved substitute for soldered joints. However, insofar as I am aware, no one prior to the present invention has found a successful, practical and commercial way of providing aluminum refrigeration coils in similar pressurizable aluminum tubular systems, nor any such tubular system without prior art soldered joints.

In order to incorporate the adhesives for producing the necessary secure and gas tight connections of refrigeration coils, there must be available a means, suitable for mass production of the coils, which can reliably apply the adhesive in a continuous gas-tight collar around the tubing joint. In spite of the long felt need within the industry for such a means which would allow the use of the preferred aluminum tubing, as far as I am aware, prior to my invention no such means has been available.

The present invention provides refrigeration coils and similar pressurizable tubular systems wherein extensive lengths exist (e.g. in a serpentine pattern) in a compact space, and also provides apparatus for simply, efficiently, and effectively producing such tubular systems.

My invention is therefore believed to materially advance the art by providing a means for producing commercially acceptable, secure and gas tight adhesively bonded tubing joints. The less expensive aluminum tubing can be used for the refrigeration coils and the considerably more expensive process of soldering can be eliminated.

In general, my invention importantly involves the use of a novel adhesive applicator. The applicator is adapted to fit the end of the tubing piece that is to provide the male portion of the connecting joint. A viscous adhesive is forced through the applicator which directs the flow thereof to predetermined points on the appropriate surface of said tubing. The flow is restricted by the applicator so that the adhesive is applied to selective areas on the end of the tubing. The tubing piece is then removed from the applicator and the adhesive coated end inserted in the female portion of the connecting joint. Following the assembly of the coil and while the adhesive is yet uncured, a vacuum pressure is preferably applied to the coil to insure intimate contact at each of the connections and to eliminate any void areas in the adhesive coating. These and other features of the invention are more fully described in the following detailed description and drawings wherein like numbers refer to corresponding parts in the several views, and wherein:

FIGURE 1 is a side view, somewhat schematic in character, of a refrigeration coil;

FIGURE 2 is an enlarged sectional view illustrating the adhesively bonded interconnection between the tubing sections;

FIGURE 3 is a front view of an apparatus illustrating a preferred form of my invention;

FIGURE 4 is a sectional view taken generally along lines 4—4 of FIGURE 3;

FIGURE 5 is an enlarged view shown partially in section, of a portion of the adhesive dispensing system collectively designated 140, 172 and 188, in the apparatus of FIGURE 3;

FIGURE 6 is a sectional view taken on lines 6—6 of FIGURE 5;

FIGURE 7 is a top, sectional view of the air operated ejector unit 172 shown in broken lines in FIGURE 3;

Figure 8:
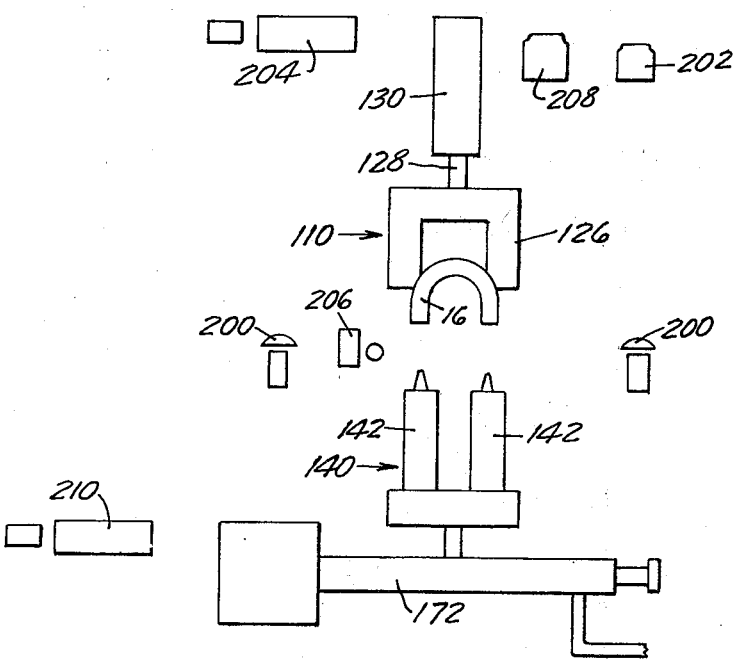
FIGURE 8 is a diagrammatic view illustrating the functional components of the apparatus of FIGURE 1.

Referring to FIGURE 1 of the drawings, the refrigeration coil illustrated therein includes a frame 10 having cooling fins 12, in which numerous sections of straight tubing 14 are mounted in a substantially parallel, side by side relationship, these being interconnected by U-shaped tubing sections 16, sometimes referred to in the singular as a "return bend." A continuous serpentine flow-path results from one side of the completed coil to the other side, with one end 20 of a straight tube 14 on each side of the coil being available and adapted for connection in the refrigeration system, e.g. to a compressor 18. The refrigerant is thus directed in an upward flow through a first straight tube 14a having its upper end connected by a return bend 16a to the upper end of a second straight tube 14b. The flow of gas is then directed downwardly in said second straight tube 14b which has its lower end connected by a return bend 16b to the lower end of a third straight tube 14c. The upward end of the third tube 14c is connected by a return bend 16c to the upward end of a fourth straight tube 14d, etc.

Referring to FIGURE 2, both ends of each straight tube 14 are formed into a bell-shape 22 to provide the female portions of each of the connecting joints between the interconnected sections. Both ends of each return bend 16 are adapted to be seated within the bell shape 22 of the straight tubes 14 and provide the male portions of the connecting joints. Such connecting joints are securely bonded by a void free continuous adhesive collar 24.

The apparatus illustrated in FIGURES 3-9 of the drawings is designed for semi-automatic operation whereby adhesive material is simultaneously applied to both ends of a return bend 16. Such operation consists of three basic systems, which include the return bend positioning system, the adhesive dispensing system and the control system. For convenience of explanation these will be considered separately, and in the order named.

Return bend positioning system (shown in FIGURES 3-6 and 8)

A return bend holder 110 is provided with a yoke member 112 and a retaining spring 114 (see FIG. 5) that cooperate to position a return bend 16 within the holder. Mounting pins 118 are affixed to the yoke member and extend rearwardly through vertical guide slots 120 of a plate member 121 forming a portion of the front wall 122 of the housing 124. Referring more specifically to FIGURES 5 and 6, the pins 118 are connected to a mounting block 126 on the opposite side of the front wall 122. A vertical guide key 116 is provided on the plate member 121 of housing 124, and a mating keyway 117 is provided in the holder 110. The holder 110 is thus slidably mounted on the housing for limited vertical movement as permitted by the keyway and by movement of the pins 118 within guide slots 120. The holder 110 is connected to a piston 128 of an air cylinder 130 mounted to a flange portion 131 of plate member 121 (FIGS. 3 and 4) for controlling the vertical movement of the holder within the limits of the slidable mounting to the housing. A coil spring 132 on the piston 128 between the holder 110 and air cylinder 130 cushions the shock of the return stroke of the piston.

Adhesive dispensing system (shown in FIGURES 3-9)

The dispensing unit 140 is fixedly mounted to the plate member 121 of the housing. The dispensing unit, most clearly shown in FIGURES 5 and 6, includes a mounting block 141 which contains a distribution manifold 143 and the assembly for a pair of applicator nozzles 142. Tubing 144 connects the manifold with a metered dispensing assembly (described later herein) contained within the housing 124. The distribution of adhesive from tubing 144 to the nozzles is controlled by a proper adjustment of set screws 146 that open and close the manifold passages 148 leading into the nozzles.

The nozzle assembly includes a cylindrical retaining wall 150 provided in the illustrated apparatus by openings bored into the mounting block 141. Adhesive guide member 154 is positioned within the cylindrical wall 150. Said guide member contains an upper peripheral shoulder 156 and a lower peripheral shoulder 158. The shoulders 156 and 158 of guide member 154 snuggly fit against the retaining wall 150 whereas the intermediate portion is spaced from the wall to define an annular spacing 160. A receiving chamber 162 is provided in the bottom of the guide member 154 with portals 164 (e.g. six portals symmetrical positioned around the guide member) connecting the chamber 162 with the annular spacing 160 just above the lower shoulder 158. A dispensing chamber 166 is provided in the top of the guide member 154 with portals 168 connecting chamber 166 with the annular spacing 160 just below the upper shoulder 156. The nozzle components in cooperation with the distribution manifold 143 thus provide an uninterrupted passageway from tubing 144 through passageway 148, into the receiving chamber 162, then through opening 164 into the annular spacing 160, and through opening 168 into the dispensing chamber 166. A centering post 170 is centrally mounted within the dispensing chamber 166 with adequate clearance from the wall of the chamber to permit the end of a tubing piece to be mounted over the centering post and into the dispensing chamber as illustrated by dotted lines in FIGURE 6.

The metered adhesive dispensing assembly contained within housing 124 includes an air operated ejector unit 172 which is illustrated in FIGURE 7 of the drawings. A piston 174 is moved back and forth within chamber 176 by air pressure controllably introduced at either end of chamber 176 through openings 178a and 178b. The piston member 174 is connected to a rod 180 which upon movement of the piston slides back and forth within barrel 182. An adhesive inlet 184 is connected through union 185 and tubing 186 (see FIGS. 3 and 4) to an air powered caulking gun 188 which contains the viscous adhesive. An adhesive outlet 190 (FIG. 7) is connected through union 191 to tubing 144 as shown in FIG. 4. While rod 180 is in its rearward position, adhesive is forced into the barrel 182 through inlet 184. Upon forward movement of the rod, portal 194 is aligned through recess 195 with outlet 190 and inlet 184 is closed. The continued movement of the rod thus forces adhesive into passage 192, through portal 194 and to the outlet 190. Return of the rod again opens the inlet 184 and the barrel is refilled with adhesive. An adjustment screw 196 governs the length of the barrel opening and accordingly the stroke of the rod 180. The amount of adhesive that is forced through outlet 190 is controlled by the stroke of rod 180 and can therefore be increased or decreased as desired by changing the adjustment of screw 196.

Control system

Figure 9:
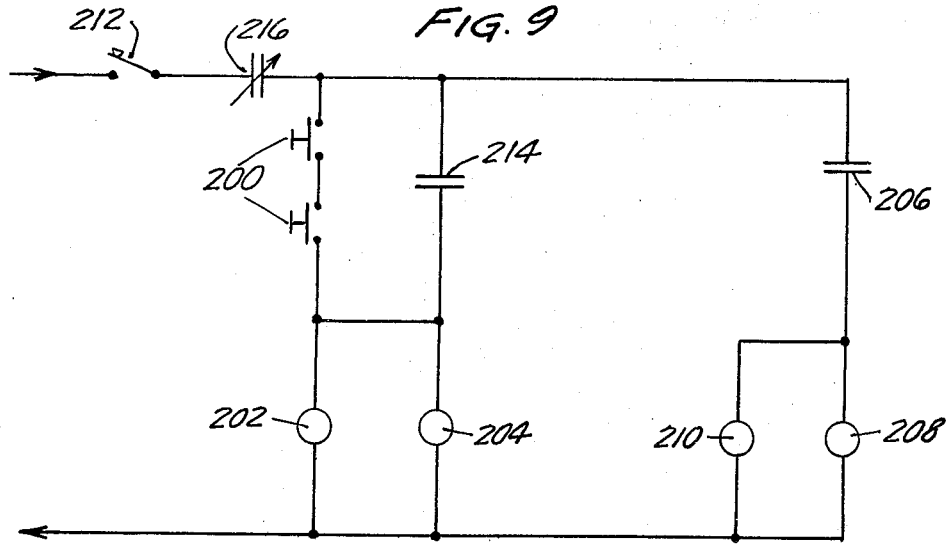
FIGURE 9 is a wiring diagram for the apparatus of FIGURE 1.

The components for operation of the control mechanism are schematically illustrated in FIGURE 8 of the drawings, and the wiring diagram thereof is set forth in FIGURE 9. Dual micro switch safety buttons 200 are mounted on the front wall 122 of the housing 124. The on-off switch 212 is engaged and the buttons 200 are simultaneously depressed to activate a holding relay coil 202. The holding relay closes the normally open switch 214 to maintain the circuit when buttons 200 are released (See FIGURE 9). A 4-way air Solenoid valve 204 within the circuit controls the air cylinder 130 which is activated to force piston 128 downward until the ends of a return bend 16 carried by holder 110 are positioned within the dispensing chamber 166 of the applicator nozzles 142. During the down stroke of the piston 128, the mounting block 126 connected by pins 118 to the holder 110, engages a micro switch 206 which simultaneously activates a time delay relay 208 and a 4-way solenoid valve 210 connected to the ejector unit 172 of FIG. 7. The valve directs air pressure through opening 178a to force the piston 174 and the ejector rod 180 to move forward. A predetermined amount of adhesive (controlled as described above in connection with FIG. 7) is pumped from the ejector unit into the dispensing unit where it is applied against the ends of the return bend.

The return bend is held in position within the dispensing chamber for as long as the circuit remains closed. The time delay relay 208 is connected to a normally closed switch 216 which is opened by the relay when a predetermined period of time has elapsed, as determined by the relay setting. The setting is made to provide a sufficient period for the adhesive to be applied to the return bend. When the switch 216 is opened, the circuit for the 4-way air solenoid valve 204 is broken and activates air cylinder 130 which withdraws the return bend 16 from the dispensing chamber and releases micro switch 206. The circuit for the 4-way air solenoid valve 210 is also broken to redirect air pressure from opening 178a to opening 178b of the ejector to cause the ejector rod to return to its rearward position to be filled with adhesive. Normally open switch 214 and normally closed switch 216 are returned to their respective normal positions, and the apparatus is in readiness for a repeat cycle.

An operator then manually removes the return bend 16 from the holder and inserts the adhesively coated ends in the bell shaped ends 22 of adjacent straight tubes 14. Another return bend 16 is placed in the holder and buttons 200 are depressed to start another cycle.

The following is an example of a specific apparatus constructed in accordance with my invention.

The apparatus is designed for applying adhesive joints to tubing of ⅜ inch diameter and accordingly the applicator nozzle used in the dispensing system included a mounting post that was .285 inch in diameter with a .095 inch radial clearance between the post and the wall of the dispensing chamber. (It will be noted that a complete change from this set-up to others designed to handle tubing of different size can be accomplished by merely replacing the holder 110 and dispensing unit 140 of the housing 124 with a holder and dispensing unit of the proper size.) The adjustment screw of the ejector unit is set to dispense 1.4 grams of adhesive for each stroke of the ejector rod, thus applying .7 gram to each end of the return bend. The time delay relay is set to hold the return bend within the dispensing chamber for 1.75 seconds. An example of an adhesive for use in this apparatus is a material of paste consistency formed from a blend of epoxy resin and rubbery butadiene-acrylonitrile copolymer and including various curing agents and activators. A generally workable class of materials includes the room-temperature stable, heat curable, epoxy resin adhesives, the specific composition of which is selected in consideration of the tubing material, surface impurity, etc. A complete coil was assembled which included 28 sections of straight aluminum tubing having a length of 14 inches. The straight tubes were interconnected by coating an appropriate number of return bends as described which were inserted into the bell shaped ends of the straight tubing sections. A stopper was placed in one end of the coil and a partial vacuum of 20–25 inches of Hg was applied to the other end for about 20–25 seconds. The vacuum was removed and the coil then placed in a 300° over for 20 minutes to cure the adhesive. The complete coil was then subjected to a destruction test wherein pressure was increasingly applied up to 2400 p.s.i. (far above that required for refrigeration coils), at which point the tubing was ruptured. The connecting joints, however, remained secure and gas tight.

I have found that in applying the adhesive to the connecting joints, it is preferable to apply a partial vacuum to the coil while the adhesive is yet uncured, e.g. as described in the example. The partial vacuum insures intimate contact between the adjoining tubing pieces and draws against the adhesive to thereby densify the adhesive collar, i.e. by filling in any existing voids which would permit gas leakage. The male and female sections will not generally be so closely fitted together as to completely block the vacuum from drawing against the adhesive, but also, such fitting is not provided with gaps so large as to permit the adhesive to be drawn into the tubing. To insure a uniform air leakage around the joint, one of the sections may be serrated.

I have further found that it is preferable to locate the ports above the base of the dispensing chamber so as to apply the adhesive at a point inwardly from the end of the tubing. As the tubing is withdrawn from the chamber, the adhesive is smeared over the end of the tubing to form a coating that is relatively thick at the point of application and which tapers off to a thinner coating near the end of the tubing. Thus when the male and female portions are joined together the greater amount of adhesive is positioned near the mouth of the bell-shaped end portion. The vacuum that is then applied draws this adhesive into the interconnection to fill the air pockets and form a continuous void free adhesive bond throughout the greater portion of the interconnection. A void free coating that occupies about 50% of the annular cavity within the interconnection is desirable for refrigeration coil, wherein said cavity is about .007 inch wide.

It will be understood that the device as described herein is subject to numerous modifications without departing from the scope of the invention. Thus for example, the novel applicator nozzle may be incorporated into a hand gun operation which may be particularly adapted for applying adhesives to large sized tubing. Furthermore, the nozzle can be designed to apply adhesive to the tubing in any number of patterns in addition to the continuous uniform collar preferred for the refrigeration coil, i.e. by repositioning portals 168 and shaping the components of guide member 154 so that spacing 166 is varied relative to the tubing. It also follows that tubing of different shapes as well as sizes can be accommodated.

Having thus described my invention, what I claim is:

1. Apparatus for providing a selectively positioned layer of fluid material on the outer surface of a work piece surface, said apparatus including an applicator nozzle having a wall defining therewith an axial chamber for receiving a workpiece, means for centering the workpiece in said chamber to form an annular cavity within said chamber and about the outer surface of said work piece, a port opening into said annular cavity, and an inlet adapted to connect to a fluid supply source for directing fluid therefrom through the port and into the cavity.

2. Apparatus as defined in claim 1 wherein said centering means comprises an axial positioning post for centrally positioning a tubular work piece within said chamber, and said port being located in said wall spaced from the base of the chamber for applying adhesive on the outer surface of the tubular workpiece inwardly from the inserted end thereof.

3. An apparatus as defined in claim 2 wherein the nozzle includes an annular spacing around the chamber and with portals selectively positioned in the wall of the chamber for communication with the annular spacing, and an inlet to the annular spacing for receiving the adhesive and directing the same through the portals and into contact with the outer surface of the positioned tubing.

4. Apparatus for providing adhesively secured tubing joints including a support, a tube holder assembly slidably mounted to the support, an adhesive applicator nozzle fixedly positioned relative to the support having an adhesive dispensing chamber for receiving the end portion of a tube carried by the tube holder assembly when said assembly is in a first slidable position, means for introducing an amount of viscous adhesive through the nozzle and into contact with the outer surface of the tube while the holder assembly is in said first position, the tube being withdrawn free of the adhesive dispensing chamber when said tube holder is in a second position.

5. A process for making a tubing joint which includes placing a tubing piece comprising the male portion of the tubing joint into an adhesive dispensing chamber of an applicator nozzle, applying a heat-curable adhesive through selectively positioned portals in the wall of the chamber against the positioned tubing to form a uniform and continuous collar of adhesive on the outer surface of said tubing, removing the tubing from the nozzle and inserting the adhesively coated male portion thereof into the female portion of a second tubing piece, applying a vacuum to the connected tubing pieces to draw the male and female portions into intimate contact and to densify the uncured adhesive collar for eliminating air pockets, and then heat curing the adhesive.

6. A process for making a tubing joint which includes placing a tubing piece comprising the male portion of the tubing joint into an adhesive dispensing chamber of an applicator nozzle, applying viscous, hardenable adhesive through selectively positioned portals onto the outer surface of said tubing piece, removing the tubing piece from the nozzle and inserting the adhesively coated male portion thereof into the female portion of a second tubing piece, applying a vacuum to the connected tubing pieces to draw the male and female portions into intimate contact and to densify the uncured adhesive. and then hardening the adhesive.

7. A process for making a tubing joint which includes placing a tubing piece comprising the male portion of the tubing joint into an adhesive dispensing chamber of an applicator nozzle, applying a room temperature stable, heat curable, epoxy resin adhesive through selectively positioned portals in the wall of the chamber against the positioned tubing to form a uniform and continuous collar of adhesive on the outer surface of said tubing, removing the tubing from the nozzle and inserting the adhesively coated male portion thereof into the female portion of a second tubing piece, applying a vacuum of about 20–25 inches of Hg to the connected tubing pieces for about 20–25 seconds to draw the male and female portions into intimate contact and to densify the uncured adhesive collar for eliminating air pockets, and then heat curing the adhesive in a 300° oven for 20 minutes.

References Cited

UNITED STATES PATENTS

| | | | |
|---|---|---|---|
| 1,931,467 | 10/1933 | Young | 165—178 X |
| 2,145,279 | 1/1939 | Spaulding | 118—317 X |
| 2,277,092 | 3/1942 | Fink | 118—317 |
| 2,795,035 | 6/1957 | Kafer | 29—157.3 |
| 2,889,582 | 6/1959 | Cooper | 156—294 X |
| 2,920,990 | 1/1960 | Been et al. | 161—184 |
| 2,950,092 | 8/1960 | Di-Niro | 165—172 |
| 3,085,549 | 4/1963 | Kacsuta | 118—317 |
| 3,222,234 | 12/1965 | De-Jean et al. | 156—499 X |
| 3,349,478 | 10/1967 | De Jean | 156—294 X |
| 3,376,180 | 4/1968 | Larson et al. | 156—294 X |

HAROLD ANSHER, Primary Examiner

U.S. Cl. X.R.

118—317; 156—578, 382, 294